No. 626,679. Patented June 13, 1899.
V. E. DOREMUS.
BACK PEDALING BRAKE.
(Application filed Feb. 1, 1898.)
(No Model.)
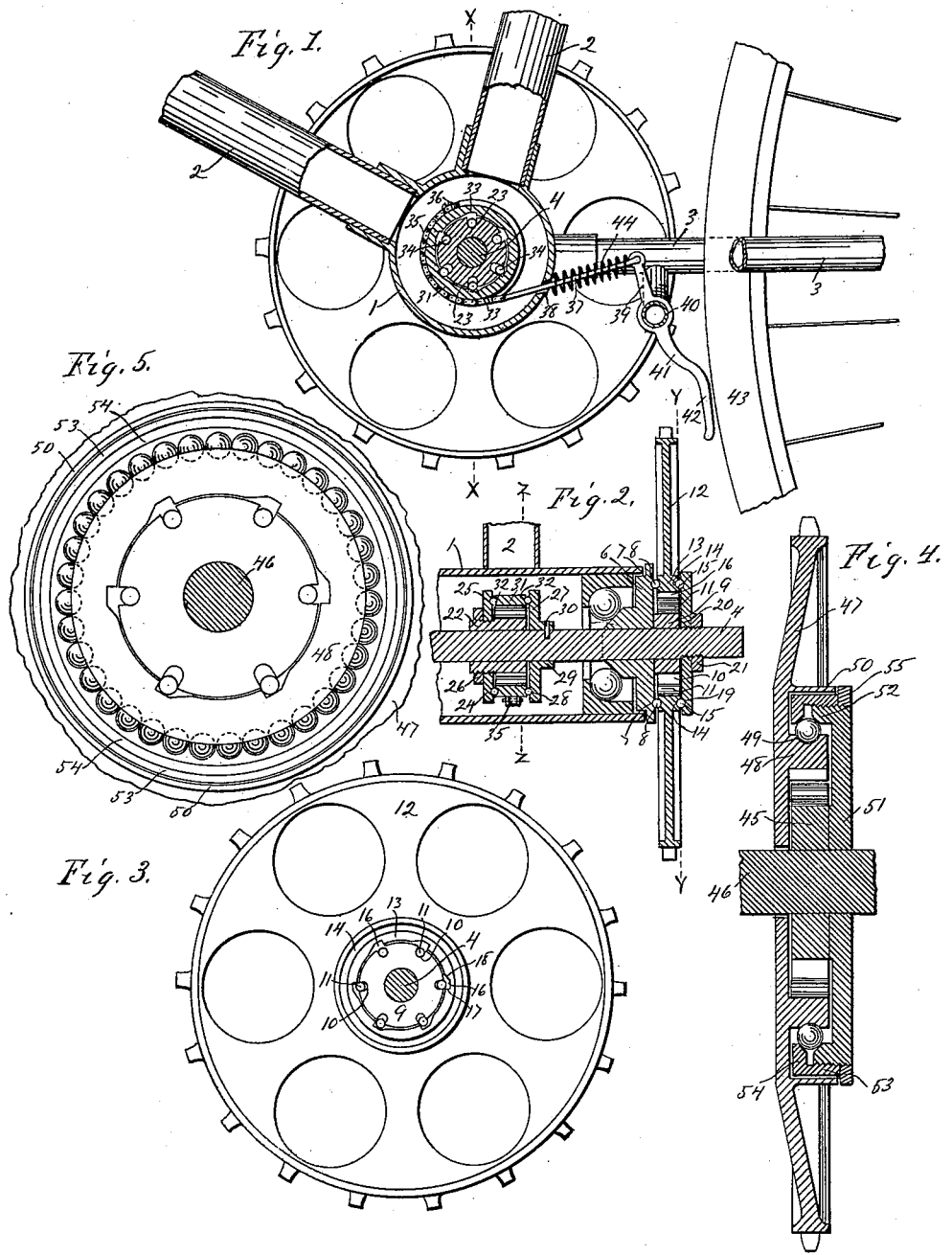
WITNESSES.
R. McComb
Emily Seidler
INVENTOR
Victor E. Doremus
BY
Clark Doremus & Co
ATTORNEY

UNITED STATES PATENT OFFICE.

VICTOR E. DOREMUS, OF NEW YORK, N. Y., ASSIGNOR, BY MESNE ASSIGNMENTS, TO THE DOREMUS BRAKE AND COASTER COMPANY, OF SAME PLACE.

BACK-PEDALING BRAKE.

SPECIFICATION forming part of Letters Patent No. 626,679, dated June 13, 1899.

Application filed February 1, 1898. Serial No. 668,724. (No model.)

*To all whom it may concern:*

Be it known that I, VICTOR E. DOREMUS, a citizen of the United States, and a resident of New York city, county of New York, and State of New York, have invented certain new and useful Improvements in Bicycle-Brakes, of which the following is a specification, reference being had to the accompanying drawings, forming a part thereof, in which similar letters of reference indicate corresponding parts.

This invention relates to an improvement in bicycle-brakes; and the object thereof is to provide a simple, economic, and efficient device of an automatic type whereby the machine may be allowed to run wild or "coast" without losing control of the pedals—an important element of danger in the usual type of bicycle driving mechanism.

Another object of the invention is to provide a simple brake which may be applied to the rim or hub of the driving-wheel by the simple action of "back-pedaling."

The invention will be hereinafter fully described, and specifically set forth in the annexed claim.

In the accompanying drawings, Figure 1 is a side elevation of the device attached to a portion of the bicycle-frame, partly sectional and on the line $z\ z$ of Fig. 2. Fig. 2 is a vertical transverse view of a portion of the same on the line $x\ x$ of Fig. 1. Fig. 3 is a side elevation of the same on the line $y\ y$ of Fig. 2. Fig. 4 is a central vertical sectional view of a modification of the sprocket-wheel and locking device. Fig. 5 is a side elevation of the same with the outer casing removed.

In applying my invention I employ a crank-hanger 1, to which are attached in the usual or any preferred manner tubes 2 2 and 3 3, forming a part of the bicycle-frame. Mounted within said crank-hanger in the usual manner is the crank-shaft 4. To said crank-shaft 4 is fixed the cone 5, which may be driven on said shaft or screwed on, as preferred. Said cone 5 is provided with a flange 6, which has upon its outer face an annular groove 7, in which the balls 8 8 are adapted to run. Immediately outside of said flange is the locking-collar 9, which may be driven on the shaft, brazed on, or formed integrally therewith. The said locking-collar is provided upon its periphery with a series of pockets 10 10, adapted to receive the locking-rollers 11 11. Said locking-rollers are of a size adapted to roll in and out of said pockets freely, and said pockets are of a sufficient depth to receive said rollers within the peripheral line of said locking-collar.

A driving-sprocket 12 has a fixed hub portion 13, upon both faces of which annular grooves 14 14 are cut, said grooves being adapted to serve in conjunction with the groove 7 and a similar groove upon the opposite side of said sprocket as races for the balls 8 8 and 15 15. The central portion of said hub is provided upon its inner periphery with a series of recesses 16 16 of a depth equal to one-half the diameter of the locking-rollers and each provided with one square shoulder 17 and one inclined shoulder 18, the object of which is to permit the rotation of the said sprocket-wheel around the said fixed collar in a forward direction, but preventing its rotation in a rearward direction, and thereby locking said collar and sprocket-wheel together.

By referring to Fig. 3 it will readily be seen that the locking-rolls on the lower half-section of the collar will roll partially out from the pockets of said collar into the recesses of the sprocket-wheel hub. In propelling the bicycle forward this engagement of the rollers in the said pockets and recesses locks the sprocket firmly to the collar and shaft; but when the pedals are stopped and the momentum of the machine keeps the sprocket in motion the inclined shoulders of said recesses will lift each roller on the lower side of said collar into its pocket without resistance. When it is desired to again resume pedaling, it is only necessary to start the pedals in a forward direction, when the rolls will again drop into the recesses by the combined action of gravity and the centrifugal force imparted thereto by the rotation of the shaft and collar.

The balls 15 15 run in grooves 19 19 on the inner face of an outer casing 20, which is adapted to thread on the crank-shaft 4. Said casing 20 is held in place by means of the lock-nut 21, threaded on the shaft 4.

Within the crank-hanger, between the ball-cups, is the locking-collar 22, which is preferably driven on the shaft 4, but may be screwed on or otherwise fastened to the said shaft. Said collar is provided with pockets 23 23, similar to the pockets of the sprocket-wheel-locking collar. Said collar is provided with a central hub, upon which the flange 24 is adapted to thread. Said flange 24 is provided upon its inner face with an annular groove 25 and is held in position upon said hub by means of the lock-nut 26, adapted to thread upon said hub. Upon the opposite side of said collar is another flange 27, provided on its inner face with an annular groove 28. Said flange is provided with a hub 29, and a pin 30, passing through said hub and into said shaft 4 radially, secures it in fixed position upon the shaft.

A ring 31, provided upon both faces with annular grooves 32 32, is mounted between said flanges upon balls running in said grooves, and its inner periphery is provided with a series of recesses 33 33, one shoulder of which is square and the other inclined, said shoulder being adapted to act upon the rollers 34 34 in a relatively opposite manner with the recesses of the sprocket-wheel—that is, when the shaft and collar are rotated forwardly the ring remains unlocked, but as soon as the shaft and collar are rotated rearwardly the ring becomes automatically locked to the fixed collar. A chain or belt 35, one end of which is fixed to said ring by means of a screw 36, is adapted to extend part way around the circumference of said ring and is pivotally connected to the brake-rod 37, which extends rearwardly through a suitable hole 38 in the crank-hanger 1. Its free end is pivotally connected to the brake-lever arm 39, which is fulcrumed upon the yoke 40, extended downwardly from and transversely between the rear stays 3 3. An extension 41 of said arm below the fulcrum terminates in the brake-shoe 42, adapted to contact with the tire 43 of the wheel. A coil-spring 44, surrounding said brake-rod 37, is adapted to normally hold said brake-shoe out of contact with the tire of the wheel.

In the modification of a sprocket-wheel shown in Fig. 4 the locking-collar 45 is brazed to the crank-shaft 46, or, if preferred, may be formed integrally therewith. The sprocket-wheel 47 is provided with an annular ring 48, upon the outer peripheral face of which the ball-race 49 is cut. Its inner periphery is provided with recesses like those shown in Fig. 3, and the collar is provided with pockets like those shown in Fig. 3, the locking mechanism being in both instances the same. An annular ring 50, formed integrally with said sprocket-wheel and arranged concentrically with said ring 48, extends outwardly with relation to the frame of the machine from the main portion of said sprocket-wheel. An outer casing 51 is driven on or brazed to said crank-shaft 46. Said casing is provided at its periphery with an inwardly-projecting flange 52, the face of which is beveled to form one side of the adjusting-cone. Adapted to thread upon the periphery of said casing is the ring 53, which is provided with a flange 54, the inner periphery of which is beveled to form an adjusting-cone. A lock-nut 55 is adapted to thread from the outside upon the periphery of said casing and against the ring 53, thereby preventing it from becoming loosened and out of adjustment. Said lock-nut is of greater diameter than the adjusting-ring and of a diameter equal to that of the outer ring of the sprocket-wheel. The object of making this lock-nut of a greater diameter than the adjusting-ring is to provide a dust-proof casing for the ball-race, for while it is possible for the dust to enter between the edge of said lock-nut and the edge of the sprocket-wheel ring it can never pass around the corners of the adjusting-ring, and thereby clog the bearing. The sprocket-wheel outside of the outer ring is dished in order to bring the strain in a direct line with the ball-bearing, which lies in the plane of the wheel.

Having thus described my invention, what I claim as new, and desire to secure by Letters Patent, is—

In a braking and coasting device of the class described, a sprocket-wheel having two concentric rings projecting outwardly from the main body of said sprocket, the inner ring being provided upon its outer peripheral face with a channel or groove adaptable as a ball-race and upon its inner peripheral edge with a series of recesses in depth equaling one-half the diameter of the locking-rollers, said recesses having one square shoulder and one inclined shoulder each, a collar fixed upon and forming part of the crank-shaft, said collar being provided with a series of pockets upon its periphery, said pockets being arranged in radial relation with the recesses in said sprocket and adapted to receive a series of locking-rollers, an outer casing brazed or otherwise fixed to said crank-shaft having an inwardly-projecting flange at its periphery, the inner face of which is beveled for contact with the balls and forming one side of the ball-race, an annular ring adapted to thread upon the periphery of said casing and provided with a beveled flange forming another side of the ball-race, a lock-nut adapted to thread on the periphery of said outer casing and prevent displacement of the annular adjusting-ring and to prevent dust from entering the bearings, the series of balls adapted to run in said ball-races and in the plane of the wheel, said sprocket-wheel being dished and adapted to bring the strain of the chain in line with the plane of the wheel and the ball-bearings thereof, substantially as shown and described.

In testimony that I claim the foregoing as my invention I have signed my name, in presence of two witnesses, this 27th day of January, 1898.

VICTOR E. DOREMUS.

Witnesses:
B. McComb,
M. G. McClean.